United States Patent
Luo et al.

(10) Patent No.: US 9,544,909 B2
(45) Date of Patent: Jan. 10, 2017

(54) METHOD AND DEVICE FOR INTERFERENCE COORDINATION

(71) Applicant: Huawei Technologies Co., Ltd., Shenzhen, Guangdong (CN)

(72) Inventors: Haiyan Luo, Shenzhen (CN); Tianle Deng, Shenzhen (CN); Ronghui Wen, Shenzhen (CN); You Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 14/500,799

(22) Filed: Sep. 29, 2014

(65) Prior Publication Data
US 2015/0016434 A1 Jan. 15, 2015

Related U.S. Application Data

(63) Continuation of application No. PCT/CN2013/073741, filed on Apr. 3, 2013.

(30) Foreign Application Priority Data

Apr. 6, 2012 (CN) .......................... 2012 1 0098785

(51) Int. Cl.
*H04W 72/08* (2009.01)
*H04B 7/04* (2006.01)
(Continued)

(52) U.S. Cl.
CPC ........... *H04W 72/082* (2013.01); *H04B 7/024* (2013.01); *H04B 7/0456* (2013.01); *H04B 7/0639* (2013.01)

(58) Field of Classification Search
CPC ...... H04W 72/082; H04B 7/04; H04B 7/0639; H04B 7/024; H04B 7/0456
See application file for complete search history.

(56) References Cited

U.S. PATENT DOCUMENTS

| 2009/0325625 A1 | 12/2009 | Hugl et al. |
| 2010/0130223 A1 | 5/2010 | Liao et al. |
(Continued)

FOREIGN PATENT DOCUMENTS

| CN | 101400135 A | 4/2009 | |
| CN | WO 2009070928 A1 * | 6/2009 | ........ H04W 72/0426 |
(Continued)

OTHER PUBLICATIONS

"3$^{rd}$ Generation Partnership Project; Technical Specification Group Radio Access Network; Evolved Universal Terrestrial Radio Access Network (E-UTRAN); X2 application protocol (X2AP)(Release 11)," 3GPP TS 36.423, V.11.0.0, pp. 1-133, 3$^{rd}$ Generation Partnership Program, Valbonne, France (Mar. 2012).

*Primary Examiner* — Ian N Moore
*Assistant Examiner* — Lakeram Jangbahadur
(74) *Attorney, Agent, or Firm* — Leydig, Voit & Mayer, Ltd.

(57) ABSTRACT

The present invention provides a method and a device for interference coordination. The method comprises: determining mutually interfering wave beams between a cell of a first base station and a cell of a second base station based on first interference information and second interference information; coordinating time-frequency resources, time domain resources or frequency domain resources occupied when the mutually interfering wave beams between the cell of the first base station and the cell of the second base station are sent, so as to reduce interference. By coordinating, wave beams of the cells of the base stations are sent in a staggered manner in terms of the time-frequency resources, the time domain resources or the frequency domain resources.

16 Claims, 4 Drawing Sheets

(51) Int. Cl.
    *H04B 7/02*    (2006.01)
    *H04B 7/06*    (2006.01)

(56) References Cited

U.S. PATENT DOCUMENTS

| | | | |
|---|---|---|---|
| 2011/0143793 A1* | 6/2011 | Kim | H04B 7/024 455/501 |
| 2011/0182375 A1 | 7/2011 | Kim et al. | |
| 2011/0183679 A1 | 7/2011 | Moon et al. | |
| 2011/0280330 A1 | 11/2011 | Tanaka | |
| 2012/0026956 A1 | 2/2012 | Benjebbour et al. | |
| 2012/0122468 A1 | 5/2012 | Gao et al. | |
| 2012/0328035 A1 | 12/2012 | Yoon et al. | |

FOREIGN PATENT DOCUMENTS

| | | |
|---|---|---|
| CN | 101507342 A | 8/2009 |
| CN | 101635929 A | 1/2010 |
| CN | 101828359 A | 9/2010 |
| CN | 102014440 A | 4/2011 |
| CN | 102348284 A | 2/2012 |
| EP | 2148546 A1 | 1/2010 |
| EP | 2254261 A2 | 11/2010 |
| JP | 2010171733 A | 8/2010 |
| JP | 2011151779 A | 8/2011 |
| JP | 2012510219 A | 4/2012 |
| KR | 101060857 B1 | 8/2011 |
| WO | WO 2009070928 A1 | 6/2009 |
| WO | WO 2010060384 A1 | 6/2010 |
| WO | WO 2011038661 A1 | 4/2011 |

* cited by examiner

US 9,544,909 B2

METHOD AND DEVICE FOR INTERFERENCE COORDINATION

CROSS-REFERENCE TO RELATED APPLICATIONS

This application is a continuation of International Patent Application No. PCT/CN2013/073741, filed on Apr. 3, 2013, which claims priority to Chinese Patent Application No. 201210098785.1, filed on Apr. 6, 2012, both of which are hereby incorporated by reference in their entireties.

FIELD OF TECHNOLOGY

The disclosure relates the field of wireless communication, and more particularly to a method and device for interference coordination in wireless communication.

BACKGROUND

Smart antenna technology may sufficiently utilize spatial characteristics of wireless resources to improve a wireless resource utilization of a wireless mobile communication system and improve the system capacity fundamentally. As a core technology of the smart antenna technology, beamforming is mainly adapted to eliminate interference between cells and improve a cell-edge user performance.

Multiple mechanisms for adjacent cell interference coordination based on beamforming are provided in a Long Term Evolution-Advanced Coordinated Multi-Point (LTE-A CoMP). A best/worst precoding matrix mechanism requires a User Equipment (UE) to report best/worst Precoding Matrix Indicators (PMIs) of the cell and adjacent cells thereof.

However, when the best/worst precoding matrix mechanism requires the UE to report PMIs of the adjacent cells, the UE firstly performs a cell searching on the adjacent cells, obtains the PMIs of the adjacent cells after synchronizing, and report the PMIs to a service base station of the cells. However, frequent reporting the PMIs of the adjacent cells by the UE will greatly increase an uplink overhead.

SUMMARY

A method and device for interference coordination are provided according to embodiments of the disclosure, which can perform the interference coordination without an increased uplink overhead.

In one aspect, a method for interference coordination is provided, which includes: determining mutual interference beams of a cell of a first base station and a cell of a second base station, based on first interference information and second interference information, where the first interference information includes a first cell set, the first cell set includes a first interference cell, and a beam interfering to a beam of the cell of the first base station belongs to the first interference cell; and where the second interference information includes a second cell set, the second cell set includes a second interference cell, and a beam interfering to a beam of the cell of the second base station belongs to the second interference; and coordinating time-frequency resources, time domain resources or frequency domain resources occupied by the mutual interference beams of the cell of the first base station and the cell of the second base station, to reduce interference.

In another aspect, a device for interference coordination is provided, which includes: a determination unit and an interference coordination unit, where the determination unit is configured to determine mutual interference beams of a cell of a first base station and a cell of a second base station, based on first interference information and second interference information, and where the first interference information includes a first cell set, the first cell set includes a first interference cell, and a beam interfering to a beam of the cell of the first base station belongs to the first interference cell; and where the second interference information includes a second cell set, the second cell set includes a second interference cell, and a beam interfering to a beam of the cell of the second base station belongs to the second interference cell; and the interference coordination unit is configured to coordinate time-frequency resources, time domain resources or frequency domain resources occupied by the mutual interference beams, determined by the determination unit, of the cell of the first base station and the cell of the second base station, to reduce interference.

The technical solutions described above provide a method for interference coordination. By performing the coordination, beams of cells of the base stations are sent on different time-frequency resources, different time domain resources or different frequency domain resources, thereby reducing the mutual interference between the beams of the cells of the base stations without an increased uplink overhead.

BRIEF DESCRIPTION OF THE DRAWINGS

In order to illustrate the technical solutions of the embodiments of the disclosure more clearly, the accompanying drawings required for the description of the embodiments or the prior art will be introduced simply hereinafter. Obviously, the following described accompanying drawings are only some embodiments of the disclosure, other accompanying drawings may be obtained by those skilled in the art according these accompanying drawings without any creative work.

DETAILED DESCRIPTION OF EMBODIMENTS

Figure 1:
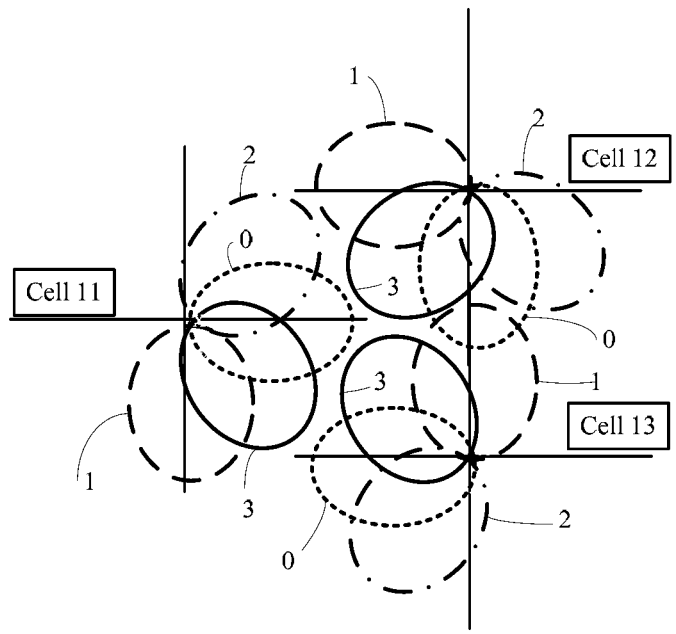
FIG. 1 is a schematic diagram showing an application scene according to an embodiment of the disclosure.

The technical solutions in the embodiments of the disclosure will be described clearly and completely in combination with the accompanying drawings in the embodiments of the disclosure hereinafter. Obviously, the described embodiments are some embodiments of the disclosure, not all the embodiments. Based on the embodiments of the disclosure, all of the other embodiments obtained by those skilled in the art without any creative work fall within the scope of protection of the disclosure.

The technical solutions of the disclosure may apply to multiple types of communication systems, such as a Long Term Evolution (LTE) or a Long Term Evolution-Advanced (LTE-A).

UE may also be referred to as a mobile terminal, mobile user equipment and so on, which may communicate with one or more core networks via a wireless access network, for example, a Radio Access Network (RAN). UE may be a mobile terminal such as a mobile phone (or referred to as a "cell" phone), and a computer with a mobile terminal, such as a portable mobile device, a pocket-sized mobile device, a handheld mobile device, a mobile device built-in a computer or an onboard mobile device, which exchanges messages and/or data with the wireless access network.

A base station may be an evolutional Node B (eNB or e-NodeB) in the LTE or the LTE-A, which includes a macro Node B, a micro Node B and so on.

In addition, terms of "a system" and "a network" may be often exchanged herein. Herein, a term "and/or" only is an association relation for describing an associated object, which indicates that there may be three types of relation. For example, A and/or B may indicate three cases that: only A exists, both A and B exist, or only B exists. In addition, herein a character "/" generally indicates that the associated objects have a relation of "or".

LTE-ACoMP also includes other adjacent cell interference coordination mechanisms based on beamforming, such as a coordinated beamforming and a Coordinated Beam Switching (CBS). The coordinated beamforming mechanism requires the UE to report spatial covariance matrices of both a cell and its adjacent cells. The CBS mechanism requires a base station to inform the UE to start the CBS mechanism, as well as requires the UE to report a best Channel Quality Indicator (CQI) in a beam switching period, and a position of the best CQI in time domain or a position of the best CQI in frequency domain, such as a sub frame identifier or a Resource Block Group (RBG) identifier.

However, the methods described above each have disadvantages. When the coordinated beamforming mechanism requires the UE to report the spatial covariance matrix of the adjacent cells, the UE firstly performs a cell searching on the adjacent cells, obtains the spatial covariance matrix of the adjacent cells only after synchronizing and reports the spatial covariance matrix to the base station to which the service cell belongs. However, frequently reporting the spatial covariance matrix of the adjacent cells by the UE will greatly increase an uplink overhead. The CBS mechanism requires the base station to inform the UE to start the CBS mechanism through an air interface, as well as requires the UE to report the best CQI in the beam switching period and the position of the best CQI in time-frequency domain, which will also results in a greatly increased uplink overhead.

An embodiment of the disclosure provides a method and a device, which achieve interference coordination between beams of cells of a base station without an increased uplink overhead.

FIG. 1 is a schematic diagram showing an application scene according to an embodiment of the disclosure. For conciseness, FIG. 1 schematically shows three cells 11, 12 and 13 controlled by different base stations. Each cell includes four beams marked by 1, 3, 0 and 2. Beamforming is performed on multiple beams of the cell of the base station based on different PMIs, and each beam corresponds to a certain PMI. As shown in FIG. 1, for convenience, in each cell of the base station, beams are arranged in a counterclockwise direction, which respectively represent beams performed the beamforming in the case of PMI=1, PMI=3, PMI=0 and PMI=2, and are also referred to beams corresponding to PMI=1, PMI=3, PMI=0 and PMI=2 for short in the context. An appearance order of the beams of the cell may be referred to as a counterclockwise order 1302. Direction of the beams is shown as FIG. 1, and the beams may interfere with each other. One UE receives not only a signal carried by a beam of a cell of a service base station, but also a signal carried by a beam of an adjacent cell simultaneously, and the adjacent cell is controlled by other base stations adjacent to the service base station. The signal carried by the beam of the adjacent cell may interfere with the signal carried by the beam of the cell of the service base station which is received by the UE normally. Because the interference is mutual, this case is also referred to as a mutual interference between a beam of the cell of the service base station and a beam of the adjacent cell controlled by the other base station, which is also referred to as a mutual interference between beams of cells of base stations, and beams interfering mutually are referred to mutual interference beams. In addition, the number of beams of the cell, the PMI corresponding to the beam and the appearance order of the beams corresponding to PMIs are only for illustration, which will not be defined by the embodiment of the disclosure.

An embodiment of the disclosure may provide a method for interference coordination. By performing the coordination, beams of cells of base stations are sent on different time-frequency resource, different time domain resource or different frequency domain resource, thereby reducing the mutual interference between the beams of the cells of the base stations without an increased uplink overhead.

Figure 2:
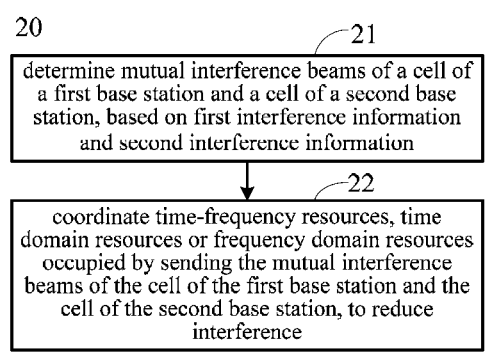
FIG. 2 is a schematic flow chart showing a method for interference coordination according to an embodiment of the disclosure.

FIG. 2 is a schematic flow chart showing a method 20 for interference coordination according to an embodiment of the disclosure. The method 20 may be performed by different network-side apparatus in a wireless communication system, such as a base station, or a network element of a core network.

In Step 21, it is determined that mutual interference beams of a cell of a first base station and a cell of a second base station based on first interference information and second interference information, where the first interference information includes a first cell set, the first cell set includes a first interference cell to which a beam interfering to a beam of the cell of the first base station belongs, and the second interference information includes a second cell set, the second cell set includes a second interference cell to which a beam interfering to a beam of the cell of the second base station belongs.

In Step 22, time-frequency resources, time domain resources or frequency domain resources, which are occupied by mutual interference beams, are coordinated to reduce interference.

By performing the coordination, the mutual interference beams of cells of different base stations may be sent on different time domain resources, may be sent on different frequency domain resources, and may also be sent on resources with both different time domain and different frequency domain, so as to reduce interference. In the context, time domain resources and frequency domain resources are referred to as time-frequency resources for short.

An embodiment of the disclosure may provide a method for interference coordination. By performing the coordination, beams of a cell of a base station are sent on different time-frequency resources, different time domain resources or different frequency domain resources, thereby reducing the mutual interference between the beams of the cells of the base stations without an increased uplink overhead.

Figure 3:
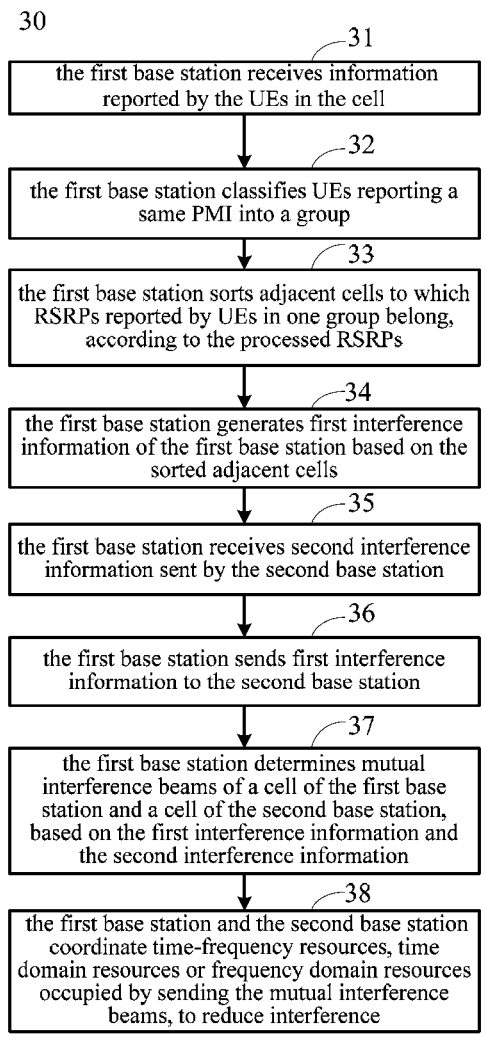
FIG. 3 is a schematic flow chart showing a method for interference coordination according to another embodiment of the disclosure.

FIG. 3 is a schematic flow chart showing a method 30 for an interference coordination according another embodiment of the disclosure. In this method, a process for performing the method 20 by a base station in a wireless communication system is illustrated.

In Step 31, a first base station receives information reported by UE of a cell.

Assuming that a present service base station is the first base station. The information reported by the UE of the cell to the service base station may be adapted to reflect a channel quality or a channel state, which is sent by the UE. The information may include for example a PMI, a Reference Signal Receiving Power (RSRP) and a CQI. Herein, the information reported by the UE may be the same as information reported before the interference coordination is performed in the existing technology.

Step 32, the first base station classifies UEs reporting a same PMI into a group.

Optionally, UEs, reporting the CQIs less than a preset threshold and the same PMI, are classified into a group. The preset threshold may be a value set according to the embodiment of the disclosure.

Step 33, the first base station receives RSRPs reported by the UEs in the same group, and sorts adjacent cells to which RSRPs reported by the UEs in the same group belong according to the received RSRPs, where the same group refers to a group of UEs reporting the same PMI.

The step of receiving the RSRPs reported by the UEs may include: processing the RSRPs reported by the UEs. The processed RSRPs may be regarded as indication information of interference intensity for a signal carried by a beam of the adjacent cell to a signal carried by a beam of the cell. There may be multiple ways for processing RSRPs, including summing the reported RSRPs, computing an average value of the reported RSRPs, calculating a minimum variance of the reported RSRPs or the like, which is not defined by the embodiment of the disclosure. For illustration, the following description is based on computing an average value of the reported RSRPs for each adjacent cell and sorting the average values of all the adjacent cells in a descending order, but the disclosure is also applicable to other methods for processing and sorting.

In an implementation, an average value of RSRPs, reported by the UEs in the same group, of the same adjacent cell is calculated; and the average value of RSRPs is regarded as RSRP of the adjacent cell. All the adjacent cells are sorted according to the average values thereof in a descending order. The adjacent cells are sorted in an order from the strong to the weak of interference to the beam of the first base station by the beams of the adjacent cells. A signal carried by the beams of the adjacent cell with a greater RSRP value generates stronger interference to a signal carried by the beams of the cell.

In an embodiment of the disclosure, for example, a first base station receives information reported by UEs in the cell. The UEs reporting PMI=0 are classified into a group, including UE1, UE2 and UE3. In this group, a relation between RSRPs reported by the UEs in the group and the adjacent cells is shown as table 1 in the following.

TABLE 1

|  | Adjacent cell 1 | Adjacent cell 2 | Adjacent cell 3 |
| --- | --- | --- | --- |
| UE1 | RSRP = 46 | RSRP = 32 | RSRP = 57 |
| UE2 | RSRP = 39 |  | RSRP = 50 |
| UE3 | RSRP = 45 | RSRP = 43 |  |

As shown above, the UEs reporting PMI=0 are classified into a group, and adjacent cell identifiers corresponding to RSRPs reported by the UEs in the group are determined. The adjacent cell identifiers are an adjacent cell 1, an adjacent cell 2 and an adjacent cell 3. An average interference on beams of the cell with PMI=0 by beams of the adjacent cell is obtained by averaging the RSRPs with the same adjacent cell identifier. Three averaged RSRPs are obtained by respectively averaging RSRPs reported by the UEs and corresponding to adjacent cell 1, adjacent cell 2 and adjacent cell 3. An order of the adjacent cells is obtained by sorting the averaged RSRPs in a descending order. For example, the sorting order is the adjacent cell 3, the adjacent cell 1 and the adjacent cell 2. In this case, a signal carried by the beams of the adjacent cell 3 causes greater interference to a signal carried by the beams of the cell with PMI=0 than a signal carried by the beams of the adjacent cell 1. Furthermore, a signal carried by the beams of the adjacent cell 1 causes greater interference to a signal carried by the beams of the cell with PMI=0 than a signal carried by the beams of the adjacent cell 2.

In another implementation, if UEs which report CQIs less than a preset threshold and the same PMI are classified into a group during grouping, only an average of RSRPs reported by UEs which report CQIs less than the preset threshold in one group is calculated. In the case that the information reported by the UE includes the CQI, it is considered that the CQI for the UE at the cell edge can reflect the interference by the adjacent cell more truly, only RSRPs reported by UEs which report CQIs less than the preset threshold in one group are selected for processing. Therefore, the first base station may actively reduce the UEs participating in the process, and improve efficiency. Furthermore, the adjacent cell identifiers corresponding to RSRPs reported by the UEs are reduced accordingly, and thus the accuracy for the interference coordination may be improved when the interference coordination is further performed on the base station to which the cell belongs.

In addition, in another implementation, a weighted average value of RSRPs is calculated by using load information obtained by interacting with the second base station to which the adjacent cell belongs as a weighting factor of the averaged RSRP. All the adjacent cells are sorted according to the weighted average value of RSRPs in a descending order. Herein, the second base station may be one or more. For example, considering interference by the adjacent cell, a weighted average value of RSRPs may be calculated by using load information interacted via an X2 protocol interface as a weighting factor, where the X2 protocol interface is a protocol interface for a communication between base stations. For example, the load information may be a wireless resource status in a TS36.423 protocol for standardizing the X2 interface application between base stations. For example, the load may be used as a weighting factor of the averaged RSRPs in the case of the computation of the interference to the certain cell.

Based on the embodiment of table 1, the first base station acquires the load information of the adjacent cell 1 via the X2 interface from a second base station to which adjacent cell 1 belongs, which is represented by L1; the first base station acquires the load information of the adjacent cell 2 via the X2 interface from a second base station to which adjacent cell 2 belongs, which is represented by L2; and the first base station acquires the load information of the adjacent cell 3 via the X2 interface from a second base station to which the adjacent cell 3 belongs, which is represented by L3. If the load information is used as a weighting factor, for beams corresponding to PMI=0, the weighted average values of RSRPs of adjacent cell 1, adjacent cell 2 and adjacent cell 3 are respectively represented by I1, I2 and I3, as shown in equations 1 to 3.

$$I1=L1\times(46+39+45)/3 \quad \text{(equation 1)}$$

$$I2=L2\times(32+43)/2 \quad \text{(equation 2)}$$

$$I3=L3\times(57+50)/2 \quad \text{(equation 3)}$$

In Step 34, the first base station generates first interference information of the first base station based on the sorted adjacent cells obtained in the above steps.

The sorted adjacent cells are first interference cells. The first base station generates the first interference information of the first base station based on the sorted adjacent cells obtained in the above steps. The first interference information includes a first cell set. The first cell set includes a first interference cell to which beams interfering to beams of a cell of the first base station belong. Optionally, several cells on the top of the sorted adjacent cells may be selected to form the first cell set. The first cell set may also include cells with interference intensity greater than a threshold, where the interference intensity is the processed RSRP. Optionally, the first cell set may include all the sorted adjacent cells described above.

Step 35, the first base station receives second interference information sent from the second base station. The second interference information includes a second cell set. The second cell set includes a second interference cell to which beams interfering to beams of a cell of the second base station belong.

"The first" and "the second" in the first base station and the second base station are only to distinguish the two base stations. In step 35, before sending the second interference information to the first base station, the second base station performs the steps similar to steps 31 to 34 performed by the first base station, and generates the second interference information, and the process is not described here for conciseness.

The first base station may function as a center control node to receive multiple second interference information sent by multiple second base stations. The first base station coordinates time domain resources occupied by mutual interference beams of the first base station and the multiple second base stations s to reduce interference, according to interference relation between beams of base stations.

In addition, in the case that the first base station and the second base station do not need to be controlled by a centre control node and are used as nodes in the same level, the method 30 may also include the following content when the first base station and the second base station respectively perform the method 20 synchronously.

Step 36, the first base station sends the first interference information to the second base station.

An order for performing step 35 and step 36 may not be defined. Step 35 and step 36 may be performed simultaneously. Through step 35 and step 36, the first interference information and the second interference information may be interacted between the first base station and the second base station. The first base station may receive the second interference information sent by the second base station and send the first interference information to the second base station via an X2 protocol interface or an S1 protocol interface. The S1 protocol interface is a protocol interface between a core network and a base station.

The method for performing interference coordination between base stations is further illustrated by interacting the first interference information and the second interference information between the first base station and the second base station. Table 2 shows an example according to an embodiment of the disclosure.

TABLE 2

| Beams formed by performing beamforming with different PMIs | Interference cell of cell A | Cnterference cell of cell B |
|---|---|---|
| beams formed with PMI = 0 | cell B, cell C | cell C, cell E |
| beams formed with PMI = 1 | cell C, cell D | cell A, cell F |
| beams formed with PMI = 2 | cell B, cell F | cell C, cell E |
| beams formed with PMI = 3 | cell C, cell D | cell A, cell C |

The first base station includes a cell A. The cell A includes four beams formed by performing beamforming with different PMIs, as shown in a second row to a fifth row of a first column. The second row to the fifth row of a second column in table 2 represent adjacent cells to which beams respectively interfering to four beams of cell A of the first base station belong. Information in the second row and the second column of table 2 is a part of the first interference information generated by the first base station, which indicates an interference to a beam of cell A of the first base station, which is formed by performing beamforming with PMI=0, caused by beams of an adjacent cell B and an adjacent cell C. The second base station includes a cell B. Information in the second row and the third column of table 2 is a part of the second interference information generated by the second base station, which indicates an interference to a beam of cell B of the second base station, which is formed by performing beamforming with PMI=0, caused by beams of an adjacent cell C and an adjacent cell E. The first cell set includes the cell B, the cell C, the cell D and the cell F. The second cell set includes the cell A, the cell C, the cell E and the cell F. Some of these cells may be controlled by a same base station, and the base station to which the cell belongs may be determined according to information reported by the UE.

Step 37, the first base station determines mutual interference beams of a cell of the first base station and a cell of the second base station based on the first interference information and the second interference information.

According to table 2, the cell B appears as an interference cell in interference cell sets of the cell A, for two groups of beams corresponding to PMI=0 and PMI=2. The cell A appears in interference cell sets of the cell B, for two groups of beams corresponding to PMI=1 and PMI=3. That is, for UEs reporting PMI=0 and PMI=2 in the cell A, beams of the cell B cause greater interference to a signal carried by beams of the cell A and received by the UEs. For UEs reporting PMI=1 and PMI=3 in the cell B, beams of the cell A cause greater interference to a signal carried by beams of the cell B and received by the UEs. Since the interference is mutual, it may be initially determined that beams of cell A formed with PMI=0 and PMI=2 cause a strong interference to beams of cell B formed with PMI=1 and PMI=3.

In Step 38, the first base station and the second base station coordinate time-frequency resources, time domain resources or frequency domain resources occupied by the mutual interference beams, to reduce interference.

The first base station, as a centralized control node, may coordinate each base station in a network via an X2 protocol interface or an S1 protocol interface, and require each base station to send the mutual interference beams on different time domain resources to reduce mutual interference, thereby improving the performance of the whole network.

In addition, in the case of no center control node, the first base station and the second base station coordinate mutually as nodes in the same level. In this case, the interference coordination may be performed by sending the mutual interference beams on different time-frequency resources, different time domain resources or different frequency domain resources. In the following, the mutual interference beams sent on different time-frequency resources is taken as an example. For example, RBG0-3 and RBG4-7 of cell A controlled by the first base station are fixedly carried on beams formed with PMI=0 and PMI=2; and RGB8-11 and RGB12-15 of cell B controlled by the second base station are fixedly carried on beams formed with PMI=1 and PMI=3, thereby avoiding mutual interference between beams of cell A and cell B.

A method for interference coordination is provided according to an embodiment of the disclosure. By performing the coordination, beams of cells of base stations are sent on different time-frequency resources, different time domain resources or different frequency domain resources, thereby reducing the mutual interference between the beams of the cells of the base stations without an increased uplink overhead.

Optionally, the first interference information may also include an interference intensity value of a first interference cell. Accordingly, the second interference information may also include an interference intensity value of a second interference cell. The interference intensity value may include an average interference intensity value or a maximum interference intensity value etc.

In this case, the first interference information and the second interference information, interacted by the first base station to which cell A belongs, are shown in an example of the following table 3.

TABLE 3

| Beams formed by performing beamforming with different PMI | A cell causing the strongest interference to beams of cell A | Average interference intensity (dBm) of a cell causing the strongest interference to beams of cell A | A cell causing secondary interference to beams of cell A | Average interference intensity (dBm) of a cell causing secondary strong interference to beams of cell A |
|---|---|---|---|---|
| beams formed with PMI = 0 | cell B | −44.5 | cell C | −49 |
| beams formed with PMI = 1 | cell C | −51 | cell D | −53.5 |
| beams formed with PMI = 2 | cell B | −56 | cell F | −60 |
| beams formed with PMI = 3 | cell C | −47 | cell D | −48.5 |

The first interference information and the second interference information, interacted by the second base station to which cell B belongs, are shown by an example of the following table 4.

TABLE 4

| Beams formed by performing beamforming with different PMI | A cell causing the strongest interference to beams of cell B | Average interference intensity (dBm) of a cell causing the strongest interference to beams of cell B | A cell causing secondary interference to beams of cell B | Average interference intensity (dBm) of a cell causing secondary strong interference to beams of cell B |
|---|---|---|---|---|
| beams formed with PMI = 0 | cell C | −55 | cell E | −51 |
| beams formed with PMI = 1 | cell A | −49.5 | cell F | −58.5 |
| beams formed with PMI = 2 | cell C | −54 | cell E | −57 |
| beams formed with PMI = 3 | cell A | −48 | cell C | −56.5 |

This embodiment differs from the embodiment of the method 30 in that besides information of the interference cell, the interference intensity value for the interference cell is also interacted. For the cell B, it is determined that the beams formed with PMI=0 and PMI=2 suffer a greater average interference from the beams of the cell C, while beams formed with PMI=1 and PMI=3 suffer a greater average interference from the beams of the cell A. Then, it is determined that the average interference intensity from cell A is greater by comparing the average interference intensity value from cell A with the average interference intensity value from cell C. Hence, the interference coordination is performed on the interference beams of the cell B and cell A, rather than the interference beams of the cell B and cell C, thereby improving the accuracy for interference coordination.

A method for interference coordination is provided according to an embodiment of the disclosure. By performing the coordination, beams of cells of base stations are sent on different time-frequency resources, different time domain resources or different frequency domain resources, thereby reducing mutual interference between the beams of the cells of the base stations without an increased uplink overhead.

Optionally, as a substitution of the method according to the above embodiment, the interference intensity value included in the first interference information and the second interference information may be replaced with an interference intensity serial number.

The substitution differs from the above embodiment in that: the interference intensity serial number instead of the interference intensity value is interacted. Table 5 shows an example for the corresponding relation between the interference intensity serial number and the interference intensity value range. The specific implementation may refer to the rules in the existing technology, which is not defined by the disclosure. As shown in the following table 5, in the case that the interference intensity falls within [−43, 42), the interference intensity serial number to be interacted is 98. The method may also improve the accuracy for interference coordination.

TABLE 5

| Average interference intensity serial number | Average interference intensity range (dBm) |
|---|---|
| 00 | <−140 |
| 01 | [−140, 130) |
| — | — |
| 98 | [−43, 42) |
| 99 | [−42, 41) |
| 100 | >41 |

A method for interference coordination is provided according to an embodiment of the disclosure to coordinate beams of adjacent cells in a staggering way, which can achieve that strong interfering beams of the cell and the adjacent cells are sent on different time-frequency resources, different time domain resources or different frequency domain resources without increasing uplink overhead, thereby reducing mutual interference.

Optionally, the first interference information may also include an appearance order for beams of a cell of the first base station. The appearance order may be represented by an appearance order for the PMI corresponding to each beam. As shown in FIG. 1, beams of one cell of the base station appears in the order of PMI=1, PMI=3, PMI=0 and PMI=2 in a counterclockwise direction. Accordingly, the second interference information may also include an appearance order for beams of a cell of the second base station.

This embodiment differs from the embodiment of the method 30 in that: the appearance order for different beams of each cell is also interacted. The appearance order may be represented by the corresponding PMI appearance order. It is beneficial to further determine a strong interference beam suffered by a single beam. For example, in Table 2, the beams of cell B is regarded as an interference source for two groups of beams, formed with PMI=0 and PMI=2, of the cell A. The beams of cell A is regarded as an interference source for two groups of beams, formed with PMI=1 and PMI=3, of the cell B. It may be initially determined that beams formed with PMI=0 and PMI=2 of the cell A and beams formed with PMI=1 and PMI=3 of the cell B are strong interference with each other.

Assuming that the cell A and the cell B in table 2 respectively represent the cell 11 and the cell 12 in FIG. 1. Referring to FIG. 1, the cell A controlled by the first base station interacts the first interference information and the second interference information with the cell B controlled by the second base station, to obtain that the counterclockwise appearance order of the PMIs corresponding to beams of cell B is 1302. For cell A, in combination with the appearance order of the PMIs corresponding to the beams of cell A, it may be determined that beams of the cell A corresponding to PMI=0 and beams of the cell B corresponding to PMI=3 cause strong interference; and beams of the cell A corresponding to PMI=2 and beams of the cell B corresponding to PMI=1 cause strong interference. Finally, interference coordination can be achieved by the mutual interference beams occupying different time-frequency resources.

In addition, in another implementation method, different embodiments may be combined together. The first interference information includes not only the first interference cell, but also the interference intensity value of the first interference cell and the appearance order for beams of the cell of the first base station. The second interference information includes not only the second interference cell, but also the interference intensity value of the second interference cell and the appearance order for beams of the cell of the second base station. Alternatively, the first interference information includes not only the first interference cell, but also the interference intensity serial number of the first interference cell and the appearance order for beams of the cell of the first base station. The second interference information includes not only the second interference cell, but also the interference intensity serial number of the second interference cell and the appearance order for beams of the cell of the second base station.

A method for interference coordination is provided according to an embodiment of the disclosure. By performing the coordination, beams of cells of base stations are sent on different time-frequency resources, different time domain resources or different frequency domain resources, thereby reducing mutual interference between beams of the cells of the base stations without an increased uplink overhead.

Figure 4:
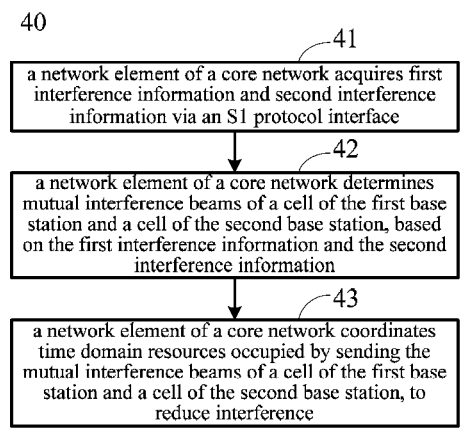
FIG. 4 is a schematic flow chart showing a method for interference coordination according to another embodiment of the disclosure.

FIG. 4 is a schematic flow chart showing a method 40 for interference coordination according to another embodiment of the disclosure. The method 40 differs from the embodiment in FIG. 3 in that a network element of a core network in a wireless communication system, such as a Mobility Management Entity (MME), may be used as a centre control node. The method 40 includes steps 41-43.

In Step 41, a network element of a core network acquires first interference information and second interference information via an S1 protocol interface. The first interference information is generated by a first base station. The second interference information is generated by a second base station.

The method for generating the first interference information and the second interference information may be referred to the embodiment of FIG. 3, which will be omitted herein for conciseness.

The network element of the core network acquires the interference information from multiple base stations via the S1 protocol interface. The first interference information and the second interference information are respectively acquired from two different base stations. The content of the interference information may be the same as that described in the multiple embodiments above. For example, the first interference information may include the first interference cell set, or the first interference cell set and the interference intensity value of the first interference cell, or the first interference cell set and the interference intensity serial number for the first interference cell, or the first cell set and the appearance order for beams of the cell of the first base station, or the first cell set and the interference intensity value of the first interference cell as well as the appearance order for beams of the cell of the first base station, or the first cell set and the interference intensity serial number for the first interference cell as well as the appearance order for beams of the cell of the first base station. Similar to the first interference information, the second interference information includes corresponding contents.

In Step 42, the network element of the core network determines mutual interference beams of a cell of the first base station and a cell of the second base station based on the first interference information and the second interference information.

The determining method in step 42 is similar to or the same as the method performed by the first base station in the method 30, which will be omitted herein for conciseness.

Step 43, the network element of the core network coordinates time domain resources occupied by the mutual interference beams of the first base station and the second base station are sent, to reduce interference.

After the network element of the core network determines time domain resources occupied by the mutual interference beams of the first base station and the second base station are sent, the network element of the core network sends the coordinated time domain resources occupied by the mutual interference beams of the first base station and the second base station to the first base station or the second base station, or both the first base station and the second base station. After receiving the coordinated time domain resources, the first base station, or the second base station, or both the first base station and the second base station send beams of cells on the coordinated time domain resources.

A method for interference coordination may be provided according to an embodiment of the disclosure. By performing the coordination, beams of cells of base stations are sent on different time domain resources, thereby reducing mutual interference between beams of the cells of the base stations without an increased uplink overhead.

Figure 5:
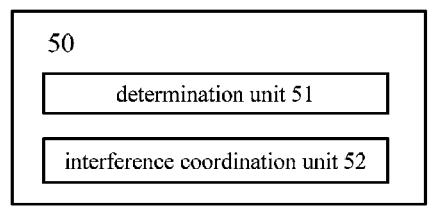
FIG. 5 is a schematic block diagram showing a device for interference coordination according to an embodiment of the disclosure.

FIG. 5 is a schematic block diagram showing a device 50 for interference coordination according to an embodiment of the disclosure.

In an implementation, the device 50 may be a network-side apparatus, such as a base station or a network element of a core network, in a wireless communication system. The device 50 includes a determination unit 51 and an interference coordination unit 52.

The determination unit 51 determines mutual interference beams of a cell of a first base station and a cell of a second base station based on first interference information and second interference information. The first interference information includes a first cell set. The first cell set includes a first interference cell to which a beam interfering to a beam of the cell of the first base station belongs. The second interference information includes a second cell set. The second cell set includes a second interference cell to which a beam interfering to a beam of the cell of the second base station belongs.

The interference coordination unit 52 coordinates time-frequency resources, time domain resources or frequency domain resources occupied by the mutual interference beams, determined by the determination unit 51, of the cell of the first base station and the cell of the second base station, to reduce interference.

The device 50 may implement the method 20, the specific details of which will be omitted herein.

A device for interference coordination is provided according to an embodiment of the disclosure. By performing the coordination, beams of cells of base stations are sent on different time-frequency resources, different time domain resources or different frequency domain resources, thereby reducing mutual interference between beams of the cells of the base stations without an increased uplink overhead.

Figure 6A:
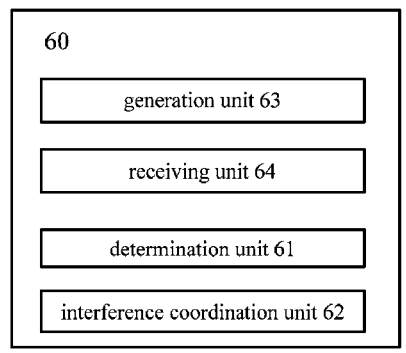
FIGS. 6A and 6B are schematic block diagrams showing another device for interference coordination according to an embodiment of the disclosure.

FIG. 6A is a schematic block diagram showing another device 60 for interference coordination according to an embodiment of the disclosure. The device 60 may be implemented as a base station. A determination unit 61 and an interference coordination unit 62 of the device 60 are the same as or similar to the determination unit 51 and the interference coordination unit 52 of the device 50. In addition, the device 60 further includes a generation unit 63 and a receiving unit 64.

The determination unit 61 determines mutual interference beams of a cell of a first base station and a cell of a second base station based on first interference information and second interference information. The first interference information includes a first cell set. The first cell set includes a first interference cell to which a beam interfering to a beam of the cell of the first base station belongs. The second interference information includes a second cell set. The second cell set includes a second interference cell to which a beam interfering to a beam of the cell of the second base station belongs.

The interference coordination unit 62 coordinates time-frequency resources, time domain resources or frequency domain resources occupied by the mutual interference beams, determined by the determination unit 61, of the cell of the first base station and the cell of the second base station, to reduce interference.

The generation unit 63 generates the first interference information to be used by the determination unit, based on information reported by a UE.

The receiving unit 64 receives the second interference information sent by the second base station, via an X2 protocol interface or an S1 protocol interface.

The device 60 may implement the method 20 and/or the method 30, the specific details of which will be omitted herein.

A device for interference coordination is provided according to an embodiment of the disclosure. By performing the coordination, beams of cells of base stations are sent on different time-frequency resources, different time domain resources or different frequency domain resources, thereby reducing mutual interference between the beams of the cells of the base stations without an increased uplink overhead.

Figure 6B:
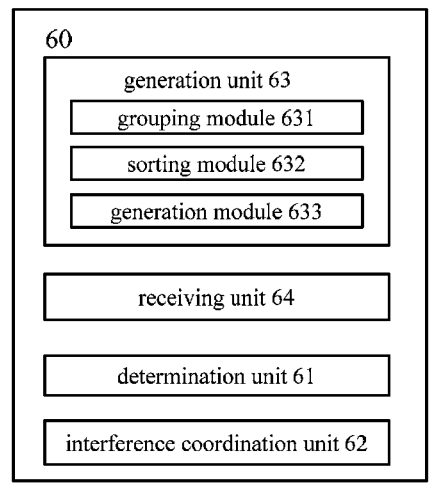

In an alternative embodiment, as shown in FIG. 6B, the generation unit 63 of the device 60 may also include a grouping module 631, a sorting module 632 and a generation module 633.

The grouping module 631 classifies UEs reporting a same PMI into a group, in the case that information reported by the UE includes a Precoding Matrix Indicator (PMI) and a Reference Signal Receiving Power (RSRP).

The sorting module 632 sorts adjacent cells to which the RSRPs reported by the UEs in one group belong, based on the reported RSRPs, after the grouping module 631 performs grouping.

The generation module 633 determines a first cell set based on the adjacent cells sorted by the sorting module 632, to generate the first interference information.

Optionally, the grouping module 631 classifies UEs reporting CQIs less than a preset threshold and the same PMI into a group, in the case that the information reported by the UE also includes Channel Quality Information (CQI).

Optionally, the sorting module 632 processes RSRPs of the same adjacent cell reported by the UEs in the same group, and sorts all the adjacent cells by using the processed RSRP as the RSRP of the adjacent cell in a descending order of RSRP. The adjacent cells are sorted in an order from the strong to the weak of interference to beams of the cell of the first base station.

Optionally, the sorting module 632 calculates a weighted average value of RSRPs by using load information obtained by interacting with the base station to which the adjacent cell belongs as a weighting factor of the processed RSRP. All the adjacent cells are sorted according to the weighted average value of RSRPs.

Optionally, the first interference information generated by the generation module 633 also includes an interference intensity value of a first interference cell, and the second interference information also includes an interference intensity value of a second interference cell. Alternatively, the first interference information also includes an interference intensity serial number of the first interference cell, and the second interference information also includes an interference intensity serial number of the second interference cell. Alternatively, the first interference information also includes an appearance order for beams of the cell of the first base station, and the second interference information also includes an appearance order for beams of the cell of the second base station. Alternatively, the first interference information also includes an interference intensity value of the first interference cell and an appearance order for beams of the cell of the first base station, and the second interference information also includes an interference intensity value of the second interference cell and an appearance order for beams of the cell of the second base station. Alternatively, the first interference information also includes an interference intensity serial number for the first interference cell and an appearance order for beams of the cell of the first base station, and the second interference information also includes an inference intensity serial number for the second interference cell and an appearance order for beams of the cell of the second base station.

Optionally, a beam of the cell of the first base station is formed by performing beamforming based on the PMI, and a beam of the cell of the second base station is formed by performing beamforming based on the PMI.

Figure 7:
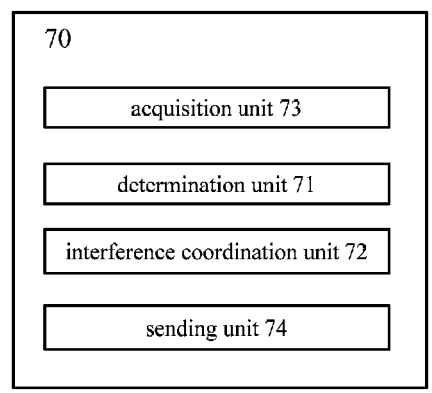
FIG. 7 is a schematic block diagram showing another device for interference coordination according to an embodiment of the disclosure.

FIG. 7 is a schematic block diagram showing another device 70 for interference coordination according to an embodiment of the disclosure.

The device 60 may be implemented as a network element of a core network. A determination unit 71 and an interference coordination unit 72 of the device 70 are the same as or similar to the determination unit 51 and the interference coordination unit 52 of the device 50. In addition, the device 70 further includes an acquisition unit 73 and a sending unit 74.

The determination unit 71 determines mutual interference beams of a cell of a first base station and a cell of a second base station, based on first interference information and second interference information. The first interference information includes a first cell set. The first cell set includes a first interference cell to which a beam interfering to a beam of the cell of the first base station belongs. The second interference information includes a second cell set. The second cell set includes a second interference cell to which a beam interfering to a beam of the cell of the second base station belongs.

The acquisition unit 73 acquires the first interference information and the second interference information to be used by the determination unit 71 via an S1 protocol interface. The first interference information is generated by the first base station, and the second interference information is generated by the second base station.

The interference coordination unit 72 coordinates time domain resources occupied by the mutual interference beams of the cell of the first base station and the cell of the second base station, where the mutual interference beams is acquired by the acquisition unit.

The sending unit 74 sends the coordinated time domain resources occupied by the mutual interference beams of the cell of the first base station and the cell of the second base station to the first base station, the second base station or both the first base station and the second base station.

The device 70 may implement the method 20 and/or the method 40, the specific details of which will be omitted herein.

A device for interference coordination is provided according to the embodiments of the disclosure. By performing a coordination, beams of cells of base stations are sent on different time domain resources, thereby reducing mutual interference between beams of the cells of the base stations without an increased uplink overhead.

Those skilled in the art may realize that various exemplary units and algorithm steps described in combination with the disclosed embodiments may be implemented as an electronic hardware or a combination of computer software and electronic hardware. Whether these functions being executed by hardware or software depends on the specific application and design constraints for the technical solutions. Professional and technical personnel may use different methods to achieve the described function for each specific application, but such achievement should not exceed the scope of the disclosure.

Those skilled in the art may clearly understand that the specific work process of the system, the device and the unit described above may refer to the corresponding process in the preceding method embodiments for convenience and conciseness, which is not described here.

According to several embodiments provided by the application, it should be understood that the disclosed system, device and method may be implemented by other ways. For example, the device embodiment described above is only exemplary. For example, the dividing for the units is only a logical function dividing, in practice there may be another dividing ways, for example multiple units or assemblies may be combined or integrated into another system, or some features may be ignored or not implemented. At another point, the displayed or discussed coupling between each other or direct coupling or communication connection may be indirect coupling or communication connection via some interfaces, devices or units, which may be electrical, mechanical or other forms.

The unit illustrated as a detach component may be physically separated or not, the component displayed as a unit may be a physical unit or not, i.e., it may be located at one position, or may be disposed on multiple network units. The objects of the embodiment solutions may be realized by selecting part or all of the units according to the actual need.

In addition, each function unit in each embodiment of the disclosure may be integrated in one processing unit, or each unit may exist individually physically, or two or more units may be integrated in one unit.

If the described function is implemented by a software function unit and sold or used as an independent product, the function may be stored in a computer readable storage medium. Based on such understanding, the part of the technical solutions of the disclosure contributing to the prior art or part of the technical solutions may be embodied as a computer software product, the computer software product is stored in a storage medium, which includes several instructions to enable a computer apparatus (for example a personal computer, a server or a network apparatus) to perform all or part of the steps of the methods according to each embodiment of the disclosure. In addition, the preceding storage medium includes various types of medium which may store program codes, such as a USB disc, a mobile hard disc, a Read Only Memory (ROM), a Random Access Memory (RAM), a magnetic disc or a compact disc.

The above described are only the specific embodiments of the disclosure, but the scope of protection of the disclosure is not defined thereto. Variation or substitution which may be easily thought of by those skilled in the art within the technical scope disclosed by the disclosure should fall within the scope of protection of the disclosure. Therefore, the scope of protection of the disclosure should be based on the scope of protection of the claims.

What is claimed is:

1. A method of a network apparatus for interference coordination, comprising:
    acquiring first interference information and second interference information via an S1 protocol interface, wherein the first interference information is generated by a first base station, and the second interference information is generated by a second base station;
    determining mutual interference beams of a cell of the first base station and a cell of the second base station, based on the first interference information and the second interference information, wherein the first interference information comprises a first cell set, the first cell set comprises a first interference cell, and a beam interfering to a beam of the cell of the first base station belongs to the first interference cell; and wherein the second interference information comprises a second cell set, and the second cell set comprises a second interference cell, and a beam interfering to a beam of the cell of the second base station belongs the second cell; and
    coordinating time-frequency resources, time domain resources or frequency domain resources occupied by the mutual interference beams of the cell of the first base station and the cell of the second base station, to reduce interference, wherein the coordinating comprises:
        determining the time domain resources occupied by the mutual interference beams of the first base station and the second base station, and
        sending the coordinated time domain resources occupied by the mutual interference beams of the first base station and the second base station, to the first base station, the second base station or both the first base station and the second base station.

2. The method according to claim 1, wherein the method is performed by the first base station, and the method further comprises:
    generating, by the first base station, the first interference information based on information reported by a User Equipment (UE); and
    receiving the second interference information sent by the second base station, via an X2 protocol interface or an S1 protocol interface.

3. The method according to claim 2, wherein the generating the first interference information comprises:
    classifying, by the first base station, UEs reporting a same Precoding Matrix Indicator (PMI) into a group, wherein information reported by the UE comprises a PMI and a Reference Signal Receiving Power (RSRP);
    sorting adjacent cells to which RSRPs reported by UEs in one group belong, based on the reported RSRP; and
    determining the first cell set based on the adjacent cells, and generating the first interference information.

4. The method according to claim 3, wherein the reported information further comprises Channel Quality Information (CQI), and the classifying UEs reporting a same PMI into a group comprises:
    classifying UEs reporting CQIs less than a preset threshold and the same PMI, into a group.

5. The method according to claim 3, wherein the sorting adjacent cells to which RSRPs reported by UEs in one group belong, based on the reported RSRP, comprises:
    processing RSRPs of a same adjacent cell reported by UEs in the group; and
    sorting all the adjacent cells by using the processed RSRP as an RSRP of the same adjacent cell in a descending order of RSRP, wherein the adjacent cells are sorted in an order from the strong to the weak of interference to the beams of the cell of the first base station.

6. The method according to claim 5, wherein after the processing RSRPs of a same adjacent cell reported by UEs in the group, the method further comprises:
    calculating a weighted average value of RSRPs by using load information obtained by interacting with the base station to which the adjacent cell belongs as a weighting factor of the processed RSRP; and
    sorting all the adjacent cells according to the weighted average value of RSRPs.

7. The method according to claim 1, wherein
    the first interference information further comprises an interference intensity value of the first interference cell, and the second interference information further comprises an interference intensity value of the second interference cell; or
    the first interference information further comprises an interference intensity serial number of the first interference cell, and the second interference information further comprises an interference intensity serial number of the second interference cell; or the first interference information further comprises an appearance order for the beams of the cell of the first base station, and the second interference information further comprises an appearance order for the beams of the cell of the second base station; or the first interference information further comprises an interference intensity value of the first interference cell and an appearance order for the beams of the cell of the first base station, and the second interference information further comprises an interference intensity value of the second interference cell and an appearance order for the beams of the cell of the second base station; or the first interference information further comprises an interference intensity serial number of the first interference cell and an appearance order for the beams of the cell of the first base station, and the second interference information further comprises an interference intensity serial number of the second interference cell and an appearance order for the beams of the cell of the second base station.

8. The method according to claim 1, wherein the beam of the cell of the first base station is formed by performing beamforming based on a Precoding Matrix Indicator (PMI), and the beam of the cell of the second base station is formed by performing beamforming based on the PMI.

9. A device for interference coordination, comprising:
a processor; and
a memory storing a plurality of computer readable instructions that, when executed by the processor, cause the device to:
acquire first interference information and second interference information via an S1 protocol interface, wherein the first interference information is generated by a first base station based on information reported by a User Equipment (UE), and the second interference information is generated by a second base station;
determine mutual interference beams of a cell of the first base station and a cell of the second base station, based on first interference information and second interference information, wherein the first interference information comprises a first cell set, the first cell set comprises a first interference cell, and a beam interfering to a beam of the cell of the first base station belongs to the first interference cell; and wherein the second interference information comprises a second cell set, the second cell set comprises a second interference cell, and a beam interfering to a beam of the cell of the second base station belongs to the second interference cell; and
coordinate time-frequency resources, time domain resources or frequency domain resources occupied by the mutual interference beams of the cell of the first base station and the cell of the second base station, to reduce interference, wherein the coordinating comprises:
determining time domain resources occupied by the mutual interference beams of the cell of the first base station and the cell of the second base station, and
sending the coordinated time domain resources occupied by the mutual interference beams of the cell of the first base station and the cell of the second base station, to the first base station, the second base station or both the first base station and the second base station.

10. The device according to claim 9, wherein the device is a base station, and the computer readable instructions, when executed by the processor, further cause the device to:

generate the first interference information, based on information reported by a User Equipment (UE); and
receive the second interference information sent by the second base station via an X2 protocol interface or an S1 protocol interface.

11. The device according to claim 10, wherein the generating the first interference information based on information reported by a User Equipment (UE) comprises:
classifying UEs reporting a same Precoding Matrix Indicator (PMI) into a group, wherein the information reported by the UE comprises a Precoding Matrix Indicator (PMI) PMI and a Reference Signal Receiving Power (RSRP);
sorting adjacent cells to which RSRPs reported by the UEs in on group belong, based on the reported RSRPs; and
determining the first cell set based on the adjacent cells, and generating the first interference information.

12. The device according to claim 11, wherein the classifying UEs reporting a same PMI into a group comprises:
classifying UEs reporting Channel Quality Information (CQIs) less than a preset threshold and the same PMI into a group, wherein the reported information further comprises CQI.

13. The device according to claim 11, wherein the sorting adjacent cells to which RSRPs reported by the UEs in on group belong based on the reported RSRPs comprises:
processing RSRPs of a same adjacent cell reported by UEs in the group, and
sorting all the adjacent cells by using the processed RSRP as the RSRP of the same adjacent cell in a descending order of RSRP, wherein the adjacent cells are sorted in an order from the strong to the weak of interference to the beams of the cell of the first base station.

14. The device according to claim 13, wherein the computer readable instructions, when executed by the processor, further cause the device to:
after the RSRPs of the same adjacent cell reported by the UEs in the same group is processed, calculate a weighted average value of RSRPs by using load information obtained by interacting with the base station to which the adjacent cell belongs as a weighting factor of the processed RSRP, and
sort all the adjacent cells according to the weighted average value of RSRPs.

15. The device according claim 9, wherein
the first interference information further comprises an interference intensity value of the first interference cell, and the second interference information further comprises an interference intensity value of the second interference cell; or
the first interference information further comprises an interference intensity serial number of the first interference cell, and the second interference information further comprises an interference intensity serial number of the second interference cell; or
the first interference information further comprises an appearance order for the beams of the cell of the first base station, and the second interference information further comprises an appearance order for the beams of the cell of the second base station; or
the first interference information further comprises an interference intensity value of the first interference cell and an appearance order for the beams of the cell of the first base station, and the second interference information further comprises an interference intensity value of the second interference cell and an appearance order for the beams of the cell of the second base station; or the first interference information further comprises an interference intensity serial number of the first interference cell and an appearance order for the beams of the cell of the first base station, and the second interference information further comprises an interference intensity serial number of the second interference cell and an appearance order for the beams of the cell of the second base station.

16. The device according to claim 9, wherein the beam of the cell of the first base station is formed by performing beamforming based on the PMI, and the beam of the cell of the second base station is formed by performing beamforming based on the PMI.

* * * * *